(12) United States Patent
Charles

(10) Patent No.: US 7,829,522 B2
(45) Date of Patent: Nov. 9, 2010

(54) ODORIZING MIXTURE FOR AN ODORLESS GAS FUEL

(75) Inventor: Patrick Charles, Sauvagnon (FR)

(73) Assignee: Arkema France, Colombes (FR)

( * ) Notice: Subject to any disclaimer, the term of this patent is extended or adjusted under 35 U.S.C. 154(b) by 625 days.

(21) Appl. No.: 11/547,832

(22) PCT Filed: Apr. 5, 2005

(86) PCT No.: PCT/FR2005/000823

§ 371 (c)(1),
(2), (4) Date: Oct. 6, 2006

(87) PCT Pub. No.: WO2005/103210

PCT Pub. Date: Nov. 3, 2005

(65) Prior Publication Data

US 2007/0219113 A1    Sep. 20, 2007

(30) Foreign Application Priority Data

Apr. 8, 2004 (FR) .................................. 04 03698

(51) Int. Cl.
*A61K 8/18* (2006.01)
(52) U.S. Cl. ...................................................... 512/25
(58) Field of Classification Search ............ 512/25
See application file for complete search history.

(56) References Cited

U.S. PATENT DOCUMENTS

| | | | |
|---|---|---|---|
| 5,877,344 A * | 3/1999 | Gande et al. | 560/205 |
| 7,108,803 B1 | 9/2006 | Mansfeld et al. | |
| 2006/0009372 A1 | 1/2006 | Mansfeld et al. | |

FOREIGN PATENT DOCUMENTS

JP          55137190          10/1980

* cited by examiner

*Primary Examiner*—John R Hardee
(74) *Attorney, Agent, or Firm*—Steven D. Boyd

(57) ABSTRACT

Composition which can be used in particular as odorant for a gaseous fuel, more particularly natural gas, comprising:
from 0.1 to 49.9% of an alkyl sulphide (I) of formula:

$$R^1-S-R^2$$

in which $R^1$ and $R^2$, which are identical or different, represent:
an alkyl radical comprising from 1 to 4 carbon atoms; or
$R^1$ and $R^2$, taken with the sulphur atom to which they are attached, represent a saturated or unsaturated ring comprising from 3 to 5 carbon atoms which is optionally substituted by a $C_1$-$C_4$ alkyl or $C_1$-$C_4$ alkenyl radical;
from 50 to 99.8% of an alkyl acrylate (II), the alkyl radical of which comprises from 1 to 12 carbon atoms, preferably from 1 to 8;
from 0.001 to 0.1 part by weight of a compound (III) which inhibits the polymerization of the alkyl acrylate (II).

13 Claims, No Drawings

ODORIZING MIXTURE FOR AN ODORLESS GAS FUEL

FIELD OF THE INVENTION

The present invention relates to the field of odorants for gaseous fuels, in particular odourless gaseous fuels, and has more especially as subject matter a composition comprising an alkyl sulphide and an alkyl acrylate which makes possible the detection of gas leaks and the prevention of the risks of explosion which result therefrom.

BACKGROUND OF THE INVENTION

Town gases and coke oven gases, which were obtained by thermal processes, were used for a long time in the past as gaseous fuels, both for public lighting and for domestic requirements. These gases comprised highly odoriferous components. Consequently, they had a strong specific odour, so that a gas leak could be easily detected.

In contrast, the gaseous fuels currently used, whether natural gas, propane, butane, liquefied petroleum gas (or LPG) or even oxygen (for example for welding operations), are essentially odourless, either because of their origin or because of the purification treatment which they have received.

Thus, if leaks are not noticed in time, the rapid formation occurs of mixtures of gaseous fuels and of air which can explode, with consequently a high risk potential.

It is for these safety reasons that the natural gas moving in gas pipelines is odorized by injection (in specialized stations) of appropriate additives known as odorants.

Natural gas is generally conveyed odourless, after an appropriate purification treatment, from the production sites to the consuming countries, either via gas pipelines or (in liquid state) in specialized ships (methane carriers). In France, for example, natural gas is thus received in a limited number of injection stations where the odorant is injected, so that the natural gas, both that which moves through the French gas pipeline network and that which is stored in underground tanks, is odorized, which makes possible easy detection in the event of a leak, wherever in the network it occurs.

In other countries, natural gas may be distributed over the area of the country by a network of pipelines in which it moves without odorant, the natural gas then being odorized as it enters the towns in which it is consumed, which requires an even higher number of injection stations.

Storage tanks are generally maintained under an atmosphere of nitrogen or of natural gas in order to limit, at this stage, the risks of explosion.

Alkyl sulphides, used as odorants, alone or as a mixture, are known. Mention may be made, for example, of diethyl sulphide, dimethyl sulphide, methyl ethyl sulphide or tetrahydrothiophene, which are widely used for their excellent properties, in particular which are capable of triggering a feeling of alarm in people in the event of an accidental leak of natural gas thus odorized and of initiating the necessary protective operations.

However, during the combustion of natural gas, these products generate an amount of sulphur dioxide which, however low it might be, becomes not insignificant when an overall balance is carried out on the scale of a country or of a region, in particular with a high level of industrialization or urbanization. Thus, by way of example, the combustion of a natural gas odorized with tetrahydrothiophene at a concentration of 10 mg/Sm$^3$ (or number of m$^3$ of the gas, measured under standard temperature and pressure conditions) generates 7.3 mg/Sm$^3$ of sulphur dioxide.

In the general context of better consideration of environmental constraints, it is therefore desirable to reduce the amounts of SO$_2$ discharged to the ecosphere via odorants based on alkyl sulphides present in natural gas during the combustion of the latter.

Furthermore, the use of alkyl acrylates as components of gas odorant mixtures is disclosed in the literature.

Thus, Patent Application DE 19837066 mentions a process for the odorization of natural gas by addition of a mixture comprising an alkyl acrylate, a nitrogenous compound of pyrazine type and an antioxidant. However, this mixture exhibits the disadvantage of not having an odour characteristic of gas and is thus capable of being misinterpreted in the event of a gas leak. The risk is, of course, the non-detection of this leak and an explosion, if the concentration of gas in the air reaches its lower explosive limit.

Patent JP55-137190 also discloses an odorant mixture combining ethyl acrylate with a specific sulphur compound, in this instance tert-butyl mercaptan (or TBM). However, the major disadvantage of this mixture is that, because of the chemical reactivity of TBM with ethyl acrylate, the 2 components of the odorant mixture have to be stored in the various injection stations in separate tanks and also require separate injection pumps and heads for introduction into the gas pipeline. This results, in view of the complex logistics for the odorization of natural gas set out above, in a considerable increase in the costs of the injection stations resulting from the necessary multiplication in the storage tanks and injection pumps and heads.

Furthermore, Patent Application WO 2004/024852 discloses an odorant consisting of four components, including an alkyl acrylate, an alkyl sulphide and an antioxidizing stabilizing agent, such as tert-butylhydroxytoluene, hydroquinone, and the like.

DETAILED DESCRIPTION OF THE INVENTION

It is an aim of the present invention to provide a novel odorant mixture which overcomes in particular the disadvantages of the odorant mixtures of the prior art set out above.

A subject-matter of the present invention is thus a composition which can be used in particular as odorant for a gaseous fuel, more particularly natural gas, comprising:

from 0.1 to 49.9% of an alkyl sulphide (I) of formula:

in which $R^1$ and $R^2$, which are identical or different, represent:

an alkyl radical comprising from 1 to 4 carbon atoms; or $R^1$ and $R^2$ taken with the sulphur atom to which they are attached, represent a saturated or unsaturated ring comprising from 3 to 5 carbon atoms which is optionally substituted by a $C_1$-$C_4$ alkyl or $C_1$-$C_4$ alkenyl radical;

from 50 to 99.8% of an alkyl acrylate (II), the alkyl radical of which comprises from 1 to 12 carbon atoms, preferably from 1 to 8;

from 0.001 to 0.1% of a compound (III) which inhibits the polymerization of the alkyl acrylate (II) and, comprising a stable nitroxide radical of formula (IV):

in which:

R³ and R⁴, which are identical or different, each represent a tertiary or secondary hydrocarbon radical comprising from 2 to 30 carbon atoms, preferably from 4 to 15, and optionally one or more heteroatoms chosen from sulphur, phosphorus, nitrogen or oxygen; or R³ and R⁴, taken with the nitrogen atom to which they are attached, represent a cyclic hydrocarbon radical comprising from 4 to 10 carbon atoms, preferably from 4 to 6, the said radical optionally being substituted.

Percentages in the present text are weight percentages unless otherwise indicated.

The composition according to the invention confers on gaseous fuels, in particular on natural gas, after its injection into the latter, a high odorant power comparable to that obtained with the odorants based on alkyl sulphide of the prior art, allowing any person present in the vicinity of a leak to recognize the latter and to take the appropriate safety measures. This high odorant power is obtained at the same time as a significant reduction in the amounts of $SO_2$ discharged to the ecosphere after combustion of the gas thus odorized. Finally, this composition, because of the absence of reactivity between the compounds (I) and (II), can be employed in injection stations using a single storage tank, a single injection pump and a single injection head, which results in considerably simplified logistics.

According to a preferred alternative form of the composition according to the invention, the composition comprises from 5 to 14.95% of compound (I), from 85 to 94.95% of compound (II) and from 0.005 to 0.05% of compound (III).

Preference is given to the use, as alkyl sulphide (I), of tetrahydrothiophene (THT), methyl ethyl sulphide (MES), dimethyl sulphide (DMS) or diethyl sulphide (DES).

The acrylic acid ester (II) is chosen in particular from methyl, ethyl, n-propyl, isopropyl, n-butyl, isobutyl, tert-butyl, pentyl, hexyl, heptyl, octyl and dodecyl acrylates.

According to a preferred embodiment of the composition according to the invention, use is made of methyl acrylate or ethyl acrylate.

According to a very particularly preferred alternative form of the invention, use is made of a composition comprising tetrahydrothiophene and ethyl acrylate.

The presence in the composition according to the invention of compound (III) has the effect of inhibiting the polymerization of the acrylates, which are very reactive monomers which can spontaneously polymerize. Such an uncontrolled polymerization is capable of placing in danger people found close to injection stations, such as residents or workers in charge of maintenance, due to the risk of explosion. If this polymerization occurs during storage, including, for example, in storage tanks or vessels of injection stations, it can also result in rapid fouling, indeed even blocking, of the pipes between the storage tank and the injection point. Such a phenomenon can result in an uncontrolled fall in the concentration of the odorant in the natural gas, which increases the risk related to an undetected gas leak.

The compounds of formula (IV) are known per se and their preparation is, for example, described in the work "Synthetic Chemistry of Stable Nitroxides" by L. B. Volodarsky et al., CRC Press, 1993, ISBN: 0-8493-4590-1.

The inhibitor of formula (IV) exhibits the advantage, in contrast to other inhibitors, such as radical inhibitors belonging to the family of the hydroquinones, of not requiring storage of the odorant mixture under air. This is because storage under air is rendered necessary for radical inhibitors of hydroquinone type owing to the fact that the active form of the inhibitor is a molecule comprising a radical which is formed following reaction with oxygen. In point of fact, it is highly advantageous, in designing injection stations, to be able to store the odorant mixture in the appropriate vessel under natural gas pressure. Such an embodiment makes it possible advantageously to increase the efficiency of the injection pumps. The inhibitor of formula (IV) also offers the advantage, for the same reason, of being able to be used in tanks for storage under nitrogen, encountered in some stations for the injection of natural gas.

According to a particularly preferred alternative form, use is made, as inhibitor of formula (IV), of a compound derived from tetramethylpiperidine oxide (also denoted by the term TEMPO) of formula (IVa):

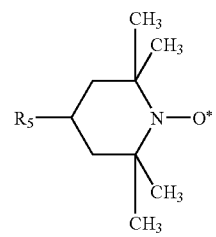

in which R⁵ represents a hydroxyl, amino, R⁶COO— or R⁶CON— group where R⁶ is a $C_1$-$C_4$ alkyl radical.

It is preferable advantageously to choose the compound of formula (III) from the following compounds:

compound (A), known as N-(tert-butyl)-N-(1-[ethoxy(ethyl)phosphino]propyl)nitroxide, of formula:

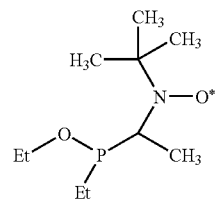

compound (B), known as N-(tert-butyl)-N-(1-diethylphosphono-2,2-dimethylpropyl)nitroxide, of formula:

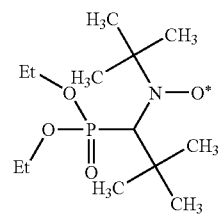

compound (C), known as N-(tert-butyl)-N-(2-methyl-1-phenylpropyl)nitroxide, of formula:

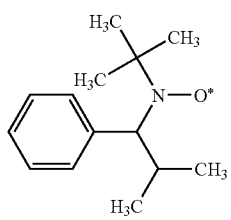

Another subject-matter of the invention is a process for the odorization of an odourless gaseous fuel comprising the addition of an effective amount of the composition comprising an alkyl sulphide and an alkyl acrylate as defined above. The amount of the said composition has to be determined by a person skilled in the art by means of systematic tests, taking into account the specific characteristics of the gaseous fuel and of the distribution networks. Purely by way of indication, this effective amount can be between 1 and 500 mg/Sm$^3$, preferably between 2 and 50 mg/Sm$^3$.

The gaseous fuels to which the process according to the invention applies comprise: natural gas, propane, butane, liquefied petroleum gas (or LPG) or even oxygen or also hydrogen, such as that generated by fuel cells. Natural gas is a preferred gaseous fuel according to the present invention due to its very widespread use and to the scale of the distribution networks, making it particularly desirable to reduce any danger resulting from the risk of leakage.

As regards natural gas, the composition which can be used as odorant is added by injection in specialized stations according to conventional techniques employed in this field.

Finally, a subject-matter of the invention is a gaseous fuel, preferably a natural gas, comprising an amount of between 1 and 500 mg/Sm$^3$, preferably between 2 and 50 mg/Sm$^3$, of the composition comprising an alkyl sulphide and an alkyl acrylate as defined above.

The following examples are given purely by way of illustration of the invention and should not under any circumstances be interpreted as limiting the scope thereof.

EXAMPLE 1

(Reference): Odorization of Natural Gas with tetrahydrothiophene 10 mg per Sm$^3$ of tetrahydrothiophene are injected into natural gas using an appropriate laboratory device.

The content of sulphur dioxide formed, after combustion of the gas thus odorized, is equal to 7.3 mg/Sm$^3$.

EXAMPLE 2

The following composition is obtained by simple mixing of the weights of the components indicated in the liquid state:

| Ethyl acrylate | 879.99 g | 87.99% |
| Tetrahydrothiophene | 120 g | 12.00% |
| Hydroxy-TEMPO | 0.1 g | 0.01% |

Example 1 is subsequently repeated, the tetrahydrothiophene being replaced by the composition thus prepared.

The gas thus odorized is subjected to an olfactory test, from which it emerges that the gas thus odorized has the same typical gas odor that of the composition of Example 1.

The content of sulphur dioxide formed, after combustion of the gas thus odorized, is equal to 0.87 mg/Sm$^3$.

EXAMPLE 3

Example 2 is subsequently repeated by preparing the following composition:

| Ethyl acrylate | 899.8 g | 89.98% |
| Tetrahydrothiophene | 100 g | 10.00% |
| Inhibitor (C) | 0.2 g | 0.02% |

The same results are obtained.

EXAMPLE 4

Example 2 is subsequently repeated by preparing the following composition:

| Ethyl acrylate | 889.9 g | 88.99% |
| Tetrahydrothiophene | 110 g | 11.00% |
| Hydroxy-TEMPO | 0.1 g | 0.01% |

The same results are obtained.

The invention claimed is:

1. Composition which can be used in particular as odorant for a gaseous fuel, more particularly natural gas, consisting of:

from 0.1 to 49.9% of an alkyl sulphide (I) of formula:
$R^1$—S—$R^2$ in which $R^1$ and $R^2$, which are identical or different, and are selected from:

an alkyl radical comprising from 1 to 4 carbon atoms; or a saturated or unsaturated ring with the sulphur atom to which they are attached, comprising from 3 to 5 carbon atoms which is optionally substituted by a $C_1$-$C_4$ alkyl or $C_1$-$C_4$ alkenyl radical;

from 50 to 99.8% of an alkyl acrylate (II), the alkyl radical of which comprises from 1 to 12 carbon atoms;

from 0.001 to 0.1% of a compound (III) which inhibits the polymerization of the alkyl acrylate (II), comprising a single, stable nitroxide radical of formula (IV):

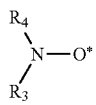

in which $R^3$ and $R^4$ are selected from:

a tertiary or secondary hydrocarbon radical comprising from 2 to 30 carbon atoms, and optionally one or more heteroatoms chosen from sulphur, phosphorus, nitrogen or oxygen; or a cyclic hydrocarbon radical with the nitrogen atom to which they are attached, comprising from 4 to 10 carbon atoms, the said radical optionally being substituted.

2. Composition according to claim 1, characterized in that it consisted of from 5 to 14.95% of compound (I), from 85 to 94.95% of compound (II) and from 0.005 to 0.05% of compound (III).

3. Composition according to claim 1, characterized in that the alkyl sulphide (I) is selected from tetrahydrothiophene (THT), methyl ethyl sulphide (MES), dimethyl sulphide (DMS) or diethyl sulphide (DES).

4. Composition according to claim 1, characterized in that the acrylic acid ester (II) is selected from methyl, ethyl, n-propyl, isopropyl, n-butyl, isobutyl, tert-butyl, pentyl, hexyl, heptyl, octyl or dodecyl acrylates.

5. Composition according to claim 1, characterized in that the acrylic acid ester (II) is methyl acrylate or ethyl acrylate.

6. Composition according to claim 1, characterized in that it comprises tetrahydrothiophene (I) and ethyl acrylate (II).

7. Composition according to claim 1, characterized in that the inhibitor of formula (IV) is a compound derived from tetramethylpiperidine oxide of formula (IVa):

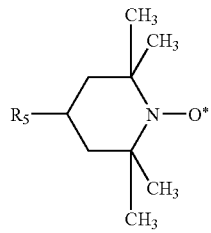

in which $R^5$ is selected from a hydroxyl, amino, $R^6COO-$ or $R^6CON-$ group and where $R^6$ is a $C_1$-$C_4$ alkyl radical.

8. Composition according to claim 1, characterized in that the compound of formula (III) is selected from N-(tert-butyl)-N-(1-[ethoxy(ethyl)phosphino]propyl) nitroxide, N-(tert-butyl)-N-(1-diethylphosphono-2,2-dimethylpropyl) nitroxide or N-(tert-butyl)-N-(2-methyl-1-phenylpropyl) nitroxide.

9. Composition according to claim 1, characterized in that said alkyl radical of said alkyl acrylate (II) comprises from 1 to 8 carbon atoms.

10. Composition according to claim 1, characterized in that said tertiary or secondary hydrocarbon radical comprises from 4 to 15 carbon atoms.

11. Composition according to claim 1, characterized in that said cyclic hydrocarbon radical comprises from 4 to 6 carbon atoms.

12. Process for the odorization of an odourless gaseous fuel comprising the addition of an effective amount of the composition as defined in claim 1.

13. Odorization process according to claim 12, characterized in that the gaseous fuel is natural gas.

* * * * *